United States Patent [19]

Dejardin et al.

[11] Patent Number: 5,226,832
[45] Date of Patent: Jul. 13, 1993

[54] DEVICE FOR CLOSING A CONTACT CAVITY OF AN ELECTRICAL OR OPTICAL CONNECTOR

[75] Inventors: Didier Dejardin, Ozoir la Ferriere; Aldo Pezzetta, Mareil Marly, both of France

[73] Assignee: Dassault Aviation, Paris, France

[21] Appl. No.: 836,919

[22] Filed: Feb. 19, 1992

[30] Foreign Application Priority Data

Feb. 22, 1991 [FR] France .................. 91 02166

[51] Int. Cl.⁵ ............................................. H01R 13/00
[52] U.S. Cl. ............................................. 439/274
[58] Field of Search .......................... 439/271–283

[56] References Cited

U.S. PATENT DOCUMENTS 2,619,515  11/1952  Doan .................. 439/279
3,880,487  4/1975  Goodman et al. ........ 439/279
4,993,964  2/1991  Trummer ............... 439/272

FOREIGN PATENT DOCUMENTS 864395  9/1981  U.S.S.R. ............... 439/279

Primary Examiner—Joseph H. McGlynn
Attorney, Agent, or Firm—Stevens, Davis, Miller & Mosher

[57] ABSTRACT

A closure for an electrical connector for sealing the inside of the connector from its surroundings, when a female or male contact part will not be used. A dummy contact having a cylindrical extent, a collar and a gripping element is placed into the unused cavity. The orientation at which the dummy contact is inserted into the cavity depends on whether the cavity is adapted for a male or female contact part.

4 Claims, 2 Drawing Sheets

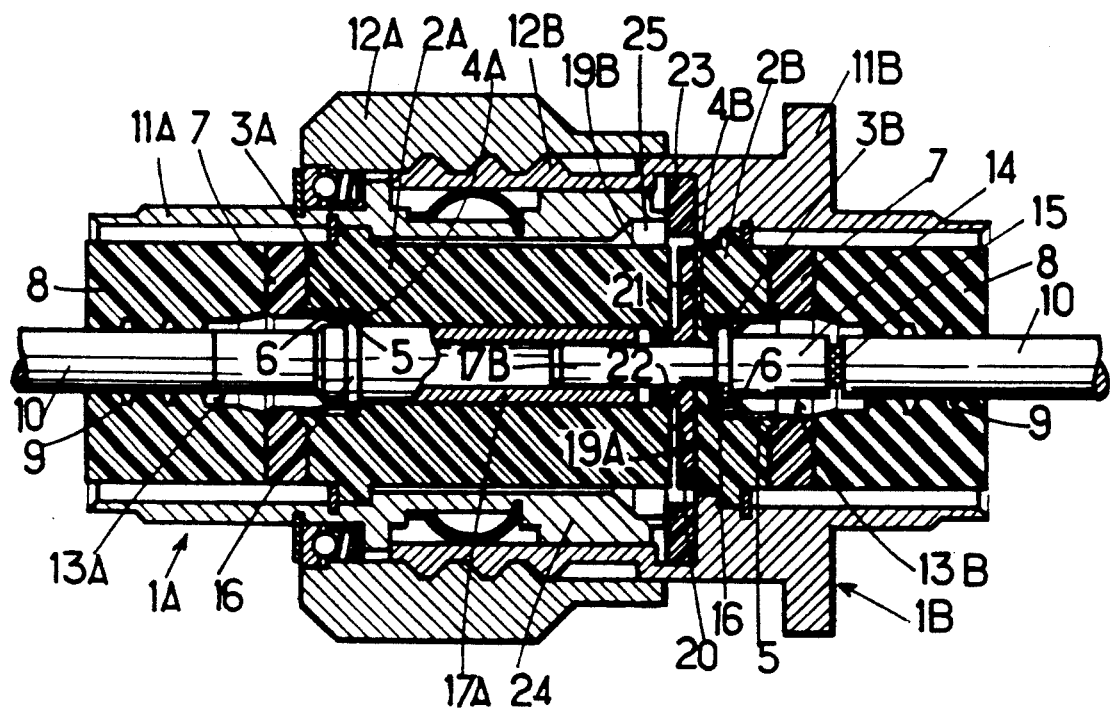
FIG.:1 PRIOR ART
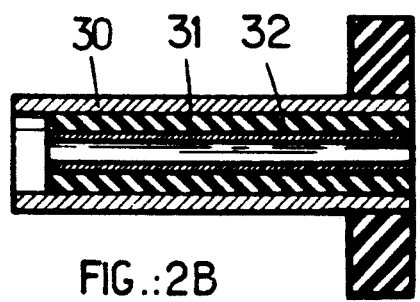
FIG.:2A PRIOR ART
FIG.:2B PRIOR ART
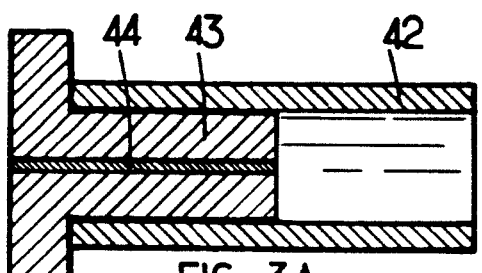
FIG.:3A PRIOR ART
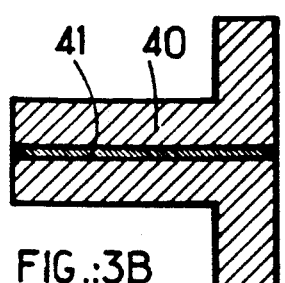
FIG.:3B PRIOR ART

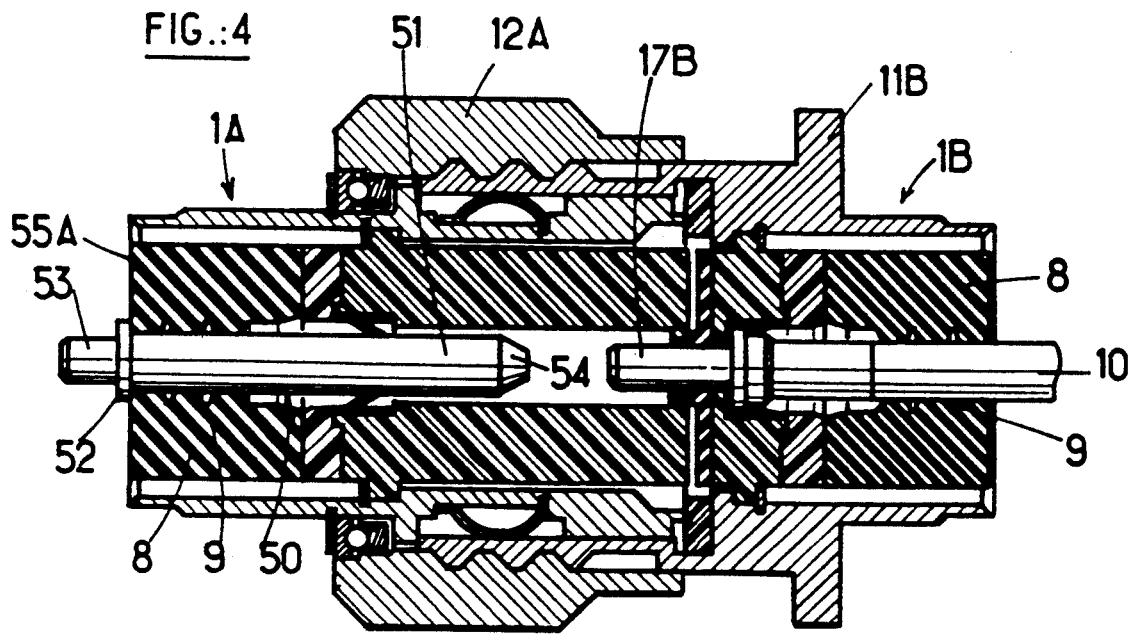
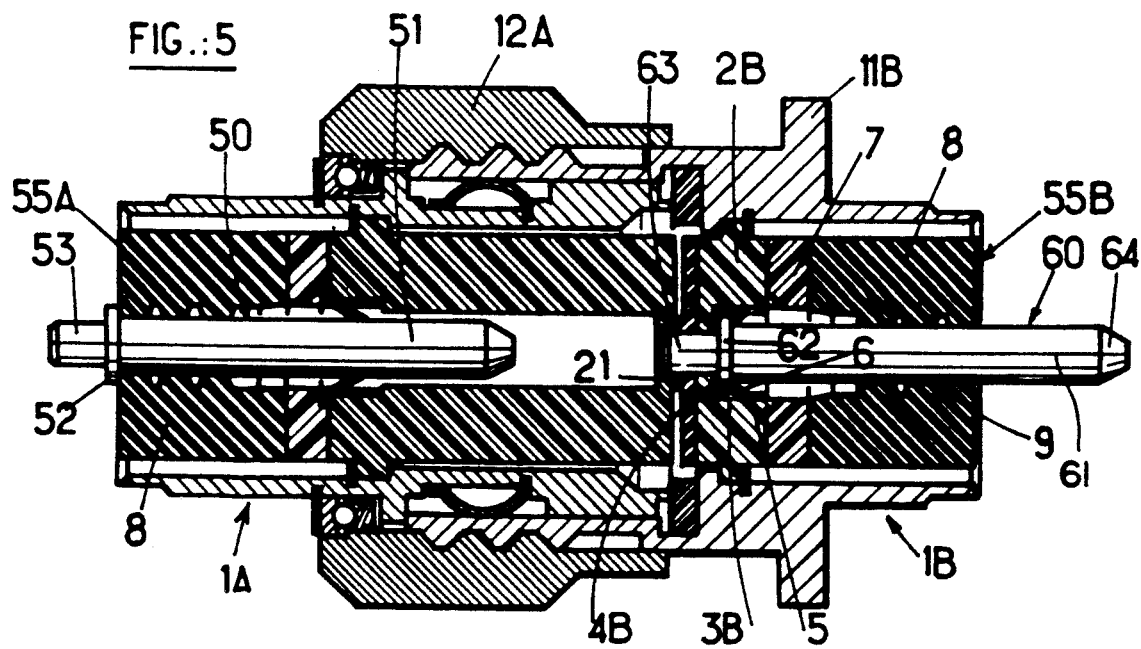

DEVICE FOR CLOSING A CONTACT CAVITY OF AN ELECTRICAL OR OPTICAL CONNECTOR

The present invention relates to a process for closing a female cavity of an electrical and/or optical connector.

BACKGROUND OF THE INVENTION

In modern technology, frequent use is made of assemblable connectors in order to transmit electrical and/or optical energy or signals. Usually, one connector part which is fixed or movable is fitted with a certain number of female contact parts and is connected to one or more sources of energy or of signals, and another part of the connector is fitted with male contact parts and is connected to an energy and/or signals user device.

It is frequent for the user device not to use all of the energies (electrical voltages for example) or all of the signals which are available from the female sockets, of the connector (hereinafter referred to as the "female" part the other part being referred to as the "male" part. For reasons of standardization, use is then made of a male part, some of whose contact parts are not connected, or else, for economy, are replaced by dummy contact parts of the same shape, but of a less costly material, for example a plastic material.

The decision not to connect a female contact part is a rarer occurrence. In this case, this contact part is left in place, so as to ensure the isolation of the cavity which contains it from the atmosphere. Its replacement by a less costly part of plastic material could have been considered, but the construction of such a part would be relatively costly owing to the fact that this would be a female part, and this solution has not been proposed.

The aim of the present invention is to provide a process for using a connector which achieves a reduced cost compared with current practice, while ensuring that the unused female cavities are well isolated from the outside.

SUMMARY OF THE INVENTION

In order to, obtain this result, the invention provides an apparatus and process for using an electrical or optical connector, formed of two assemblable parts. The first assemblable part comprises a support through which passes at least one cavity designed to receive a male contact part, this support being securely attached to a retaining and protecting sleeve termed a "back block" or grommet. A bore is provided in the "back block" with a diameter calculated to allow the passage of a conductor connecting a contact part to the outside, while ensuring a leaktight contact with this conductor. The other assemblable part comprises a support through which passes at least one cavity designed to receive a female contact part, this support being securely attached to a "back block" or grommet. A bore is provided in the "back block" with a diameter calculated to allow the passage of a conductor connecting a female contact part to the outside while ensuring a leaktight contact with this conductor.

The process having the special feature that, if no female part is provided in a female cavity, a closing device is provided comprising a cylindrical part of diameter substantially equal to that of the corresponding conductor, and a part for gripping, at least a portion of which has a diameter greater than that of said cylindrical part. The gripping part being connected to the cylindrical part by a radial step. When the closing device is driven into the corresponding passage, cylindrical part is in the front, until the radial step abuts against the "back block". The length of the cylindrical part of the closing device being calculated so that after a fitting of the closing device. The cylindrical part ensures an appropriate leaktightness of the female cavity with respect to the outside, but does not come into contact with a male contact part penetrating into the female cavity when the connector is assembled.

Preferably, the same closing device is used in the case where the male cavity has a step directed opposite to the female part, and no male part is provided in the male cavity. assembly of the connector, the male cavity being aligned with a tubular sleeve provided in a flexible interfacial layer borne by that face of the male support which is turned towards the female support, the closing device is used whose part for gripping has a second step oriented opposite to that which is adjacent to the cylindrical part (thus forming a washer-like element), and the closing device is exten second step by a cylindrical rod able to penetrate into the male cavity beyond its step and into said tubular sleeve without projecting substantially beyond the latter when the second step of the closing device bears against the step of the male cavity, and the length of the cylindrical part of the closing device is sufficient in order for the cylindrical part, when the second step bears against the step of the male cavity, to project outside the retaining sleeve, with the result that it ensures the leaktightness of the male cavity and, in addition, constitutes a part for gripping which enables it to be extracted if so wished.

In this manner, the closing device may also be used, if the need arises, in order to close the male cavity, and this is an additional source of savings.

BRIEF DESCRIPTION OF THE FIGURES

The invention will now be explained in greater detail with the aid of a practical example, illustrated with the aid of the drawings, among which:

FIG. 1 is a cross section of a known simple connector, wired and provided with male and female contact parts for transmission of power.

FIGS. 2A and 2B prior art, show the ends of the male and female contact parts in the case of coaxial conductors.

FIGS. 3A and 3B, prior art, show the ends of the male and female contact parts in the case of optical conductors.

FIG. 4 shows a connector identical to that of FIG. 1, but in which the female contact part is replaced by a closing device according to the invention, and FIG. 5 shows a connector identical to that of FIG. 1, but in which both contact parts have been replaced by closing devices according to the invention.

DETAILED DESCRIPTION OF A PREFERRED EMBODIMENT OF THE INVENTION

The connector shown in FIG. 1 comprises a "female" part 1A, which comprises a female contact part, and a "male" part 1B, which comprises a male contact part. These two connector parts comprise a certain number of similar elements which perform the same function. The references of these elements comprise the same number followed by the letter A or B depending on whether they form part of the female part or of the male part, or not followed by a letter if it is unnecessary to distinguish between them.

Each connector part 1A, 1B shown comprises a contact parts support 2A, 2B, in rigid plastic material, through which passes a bore 3A, 3B, having two parts of different diameters separated by a step 4A, 4B. The shape of the support parts 2A, 2B is not the same for the female and male parts, as will be explained later in detail.

Each bore 3A, 3B contains a ring 5 of resilient metal, bearing tabs 6 directed towards the axis. The ring 5 is held in place by a backing piece 7, of rigid plastic material, secured on the support 2 and provided with a bore of diameter slightly smaller than that of the widest part of the bore 3A, 3B.

Each support 2A, 2B comprises a retaining and protecting sleeve 8, or "back block", coaxial with the bore 3A, 3B. This back block 8 is of a semi-rigid material, namely hardened rubber, and has, on the side opposite to the support 2, radial internal ribs 9, of rounded cross section, which delimit narrowed passages, the diameter of which at the peaks is slightly smaller than the outer diameter of a cable 10 which will be described later. The assembly formed by the support 2A, 2B, the backing piece 7 and the back block 8 is located inside a coupling part 11A, 11B.

The coupling parts 11A, 11B are designed so as to slide one in the other, so as to ensure the relative centering of two connector parts 1A, 1B, and one of the coupling parts 11A bears a rotatably mounted nut 12A which is designed to co-operate with a thread 12B borne by the other coupling part. This fastening may be replaced by a bayonet connection.

The cavity defined by the bore 3A, 3B and the inside of the back block 8 is occupied in part by the end of the cable 10, and by the contact part 13A, 13B which is connected to the cable 10. This contact part is made of metal, essentially a beryllium bronze, and comprises three parts: a crimp tube 14, designed to be crimped onto the bared end 15 of the cable 10, a retaining collar 16 integral with the crimp tube 14, and a female or male contact element 17A, 17B. In the example shown, female contact element 17A is a metal tube closed in the vicinity of the collar 16 and open at the opposite end. It may comprise longitudinal slots, not shown, in order to increase its flexibility. The male contact element 17B, in the example shown, is cylindrical, solid, with only a chamfer towards its end opposite to the collar 16.

The inner diameter of the female contact element 17A and the outer diameter of the male contact element contact between these elements. As shown in FIG. 1, the length of the female contact element 17A is not very different from that of the contact element, but the step 4A of the female support 2A is at a relatively large distance from the frontal face 19A of this support, that is to say the face which is turned towards the part opposite to the connector, whereas the step 4B of the male support 2B is at a small distance from the frontal face 19B of the latter support. The construction is such that the end of the female contact element 17A is inside the corresponding support 2A, whereas the male contact element 17B penetrates into the bore 3A of the female support 2A.

The outer diameter of each contact element 17A, 17B is such that it passes with a slight clearance into the narrow part of the corresponding bore 3A, 3B. The collar 16 is held in place between the step 4A, 4B of the bore 3A, 3B and the ends of the tabs 6 of the collar 5.

The frontal face 19A of the male support 2A bears an "interfacial layer" 20, that is to say a disk of flexible rubber, provided, on its face opposite to the support 2A, with a tubular sleeve 21, whose diameter at rest is slightly smaller than that of the contact element 17A. When the connector is assembled, the frontal face 19A of the female support 2A comes to bear against the outer edge of the sleeve 21 via a hollow cone-shaped surface 22, which is coaxial with the contact part, and comes to grip the sleeve against the contact element. A seal 23, borne by the coupling part 11, is gripped by an internal sleeve 24 of the coupling part of the other connector part, so as to isolate from the external atmosphere the space 25 located between the two connector parts.

The assembly of a connector part is easily deduced from the above. After having secured the contact part 13A or 13B on the bared end 15 of the wire by crimping of the crimp tube 14, the contact part is inserted into the cavity by separating the ribs 9 of the back block 8, and it is caused to advance until the collar 16 passes beyond the tabs 6. The contact part is then immobilized between these tabs and the step 4.

In order to withdraw the contact part, an appropriate tool, with tubular end, termed "quill" is inserted, passing between the ribs 9 and the cable 10, which pushes the tabs 6 back radially, and this enables the contact part to be extracted by pulling on the cable.

FIGS. 2A, 2B, 3A, 3B show contact parts of different shapes.

FIGS. 2A, 2B show a coaxial contact part in which the male contact part, instead of being a solid cylinder, is a hollow metal cylinder 30 inside which is located a second hollow cylinder 31, also made of metal, connected to the core of a coaxial cable, not shown, and insulated by an insulating sleeve 32 from the outer tube 30, which is connected to the screen of the coaxial cable. The female contact part comprises, an outer metal tube 33, connected to the screen of the corresponding cable, and a central pin 34, connected to the core of the cable. The inner diameter of the tube 33 permits a good electrical contact with the outer tube 30 of the male element, whereas the outer diameter of the pin 34 permits a good contact with the inner surface of the tube 32.

FIGS. 3A and 3B show a connection part for connecting optical fibers together. The male part comprises a cylindrical part 40, of metallic or ceramic material, through which passes axially the extension of an optical fiber 41, the frontal end of which is carefully polished. The female contact part comprises an outer tube 42, of metal, and designed to be centered on the male part 40, and a cylinder of metallic or ceramic material 43, included inside the tube 42, and containing axially the end of an optical fiber 44, whose frontal surface is also carefully polished. Springs, not shown, push the two frontal faces of optical fiber so as to hold them in contact against one another.

These FIGURES clearly show that if a male part of a certain type comes to bear against a female part of a different type, irreparable damage to one or other of these parts may ensue.

The same would apply with other types of contact, for example with contact parts of the "triaxial" type not shown here.

It should be noted that the remainder of the connector is identical whatever the shape of the contact parts, including where the collar 16 is concerned.

FIG. 4 shows an embodiment according to the invention. The closing device 50, of insulating and opaque plastic material, comprises a solid cylindrical part 51, of outer diameter substantially equal to that of the conductor 10. This part 51 is connected to a collar 52, which is extended by a solid cylindrical rod 53. The end of the rod 51 comprises a chamfer 54.

As is shown in FIG. 4 when the closing device 50 is in its position of use, its cylindrical part 55 is driven into the cavity of the back block 8 of the female part 1A, and is retained there by the internal ribs 9, which at the same time ensure the leaktightness of the cavity with respect to the outside. The collar 52 bears against the outer face 55A of the back block 8. The length of the cylindrical part 51 is calculated so that its end cannot come into contact with the end of the male contact element 17B which faces it. The length of this cylindrical part is however sufficient to ensure good retention and good leaktightness by co-operation with the ribs 9.

The collar 52 must be of sufficient diameter to prevent the closing device, when it is being fitted or subsequently, from being driven by mishandling more deeply into the back block than has been indicated. Such an excessive driving in could produce an unwanted contact with the end of the male contact element 17B, and damage it, especially if the latter is of more complex shape than that shown in FIG. 4, for example one of the shapes of FIGS. 2B or 3B.

The cylindrical rod 53 serves here solely as element for gripping, and therefore does not, in this case, have to meet precise specifications.

For the case where the male contact element is an optical transmission element, it will be noted that the closing device, on the one hand, is made of an opaque material, and, on the other hand, is in leaktight contact with the ribs 9, with the result that no parasitic radiation can reach the male contact element. As the connector material is also electrically insulating, the same closing devices may replace electrical and optical contact parts, leading to a reduction in costs.

FIG. 5 relates to the case where not only the female contact part 13A, but also the male contact part 13B, is absent. The internal cavity of the assembled connector must therefore be closed at both of its ends.

For this application, a second closing device, in addition to the closing device 50 which has just been described, and which closes the female part 1A of the connector, 60 must be reversed that of device 50 is used in order to close the male part 1B. Advantageously, the second closing device 60 is identical to the first closing device 50.

For this application, the orientation of the closing device 60, that is to say that its cylindrical part 61, which is identical to the cylindrical part 51 of the closing device 50, is directed towards the outside of the connector, and its rod 63 is directed towards the inside of the connector. The collar 62 bears against the step 4B of the support 2B, and the closing device 60 is retained by the resilient tabs 6 placed in the bore 3B, acting on the collar 62.

In order for this to be possible, a certain number of additional geometrical conditions must be fulfilled:
the length of the cylindrical part 61 must be sufficient so that, when the collar 62 bears against the step 4B, part 61 reaches at least one of the ribs 9 of the back block 8 of the male part 1B, and preferably projects towards the outside beyond the back face 55B of this back block, so as to facilitate its possible removal.

The collar 62 must have a thickness close to that of the collar 16 of the male contact part which the closing device 60 replaces. If the collar is too thin, it will be fragile; if it is too thick, it cannot be retained by the resilient tabs 6 when it bears against the step 4B. Furthermore, the diameter of the collar must be close to that of the collar 16 if it were wider, it would pass with difficulty through the slots 9 or would even be stopped by the backing piece 7; if it were narrower, it would no longer perform the stop function against the back face 55A of the back block 8 of the female part 1A, as was explained above.

The cylindrical rod 63 should preferably have sufficient length to penetrate into the sleeve 21 and to project very slightly beyond the latter, without however extending far enough to risk a contact with the end of the part 51 of the other closing device. Advantageously, the rod 63 is short enough not to enter into contact with a female contact part 13A in the case where the latter has been retained. The reason for a minimal length for the rod 63 is to prevent a deformation by flow or otherwise of the sleeve 21 under the effect of the thrust of the conical surface 22. Furthermore, the diameter of the rod 63 should, preferably, be close to that of the contact element 17A which it replaces. Too small a diameter provides inadequate holding of the sleeve. Too large a diameter risks preventing the passage into the narrowed part of the bore 3B which leads on from the step 4A. Advantageously, the rod 63 has a chamfer 64 at its end, in order to facilitate its fitting by being driven into the back block 8, through the grooves 9, and into the sleeve 21.

Experience shows that, for most of the standardized connectors currently in use, the above multiple geometrical conditions can be fulfilled, and even that closing devices can be used for connectors which are different but comprise contact parts of close sizes.

The fitting of the closing device 60 is performed in exactly the same manner as the fitting of an effective contact part. First it is sufficient to drive-in the closing device 60, causing the ribs 9 to bend, until the collar 62 has retained tabs 6 and is retained between the latter and the step 3B. In order to withdraw the closing device 60, it is sufficient to separate the tabs 6 with the aid of the "quill" which serves to remove the effective contact parts, and slowly to withdraw this quill, which carries the closing device along by friction.

We claim:
1. An environmental sealing plug for an electrical or optical connector having an interior and an exterior and including a male unit comprising a first support member with a bore therethrough for receiving a male contact part;
said first support member attached to a first grommet with a bore therethrough for receiving a first conductor connecting said male contact part to the exterior of said connector;
said male unit being assemblable with a female unit comprising a second support member with a bore therethrough for receiving a female contact part;
said second support member attached to a second grommet with a bore therethrough for receiving a second conductor connecting said female contact part to the exterior of said connector, said environmental sealing plug for sealing the female unit and comprising:

a cylindrical shaft having a diameter substantially equal to the diameter of said second conductor; and a gripping section having a portion with a diameter greater than the diameter of said cylindrical shaft; said gripping section connected to said cylindrical shaft via a radial step; wherein said environmental sealing plug is disposed in a first orientation and said cylindrical shaft extends through the bore of said second grommet and into the bore of said second support member so that said radial step abuts against the outer periphery of said second grommet, thereby sealing said female unit from the exterior of said connector.

2. An environmental sealing plug, according to claim 1, wherein a male contact is extended through the bore of said first support member into the bore of said second support member and the length of said cylindrical shaft is insufficient to provide contact between said environmental sealing plug and said male contact.

3. An environmental sealing plug, according to claim 1, wherein said cylindrical shaft is formed of a non-conductive and opaque material.

4. An environmental sealing plug, according to claim 1, wherein the diameter of said cylindrical shaft is substantially equal to the diameter of said bore of said first grommet and the diameter of said portion of the gripping section is smaller than the diameter of said bore of said first support member, whereby said environmental sealing plug is also able to be reversed in orientation, in comparison to said first orientation, and inserted through said bores of said first grommet and said first support member.

* * * * *